United States Patent [19]

Eigner

[11] Patent Number: 4,909,825

[45] Date of Patent: Mar. 20, 1990

[54] PROCESS AND APPARATUS FOR DRYING AND CONDITIONING CHICKEN MANURE OR SIMILAR PASTY SUBSTANCES

[76] Inventor: Erich Eigner, Leitersdorf 4, A-8334 Lödersdorf, Styria, Austria

[21] Appl. No.: 942,631

[22] PCT Filed: Jan. 23, 1986

[86] PCT No.: PCT/AT86/00008

§ 371 Date: Nov. 26, 1986

§ 102(e) Date: Nov. 26, 1986

[87] PCT Pub. No.: WO86/04576

PCT Pub. Date: Aug. 14, 1986

[30] Foreign Application Priority Data

Feb. 1, 1985 [AT] Austria .................................. 292/85

[51] Int. Cl.$^4$ .............................. C05F 3/00; C05F 3/06
[52] U.S. Cl. ............................................. 71/9; 71/10; 71/21; 422/184
[58] Field of Search ...................................... 71/9–10, 71/12, 21; 34/169; 263/8; 422/184

[56] References Cited

U.S. PATENT DOCUMENTS 2,660,809 12/1953 Morrison ................................ 34/169
3,697,056 10/1972 Prins, Sr. et al. ....................... 263/8

FOREIGN PATENT DOCUMENTS 2099969 12/1982 United Kingdom .

Primary Examiner—Ferris H. Lander
Attorney, Agent, or Firm—Spencer & Frank

[57] ABSTRACT

In a method and device for drying and conditioning poultry manure or similar pasty materials in the form of particles, selective micro-organisms are, in a microbiological phase, fixed onto stable moulded carrier element, added to the past material to be treated, optimum climatic conditions being generated with air conditioned for the activity of the micro-organisms. Released heat as well as water vapor are evacuated. In the case of a temperature drop, the microbiological phase is substituted by an air stream drying which is terminated when the desired dessication degree is obtained. The device comprises a closed cylindrical tank (1) wherein there is arranged a suspended mounting which may vibrate vertically and which is comprised of two cylindrical coaxial air-tight mantels (14,15) between which are distributed the carrier elements for the selective micro-organisms. A conduit (9) and an air distribution space (13) are provided for the air supply; the discharge of air is effected through the inner cylindrical mantel (15) and an exhaust pipe starting from the bottom of the tank.

8 Claims, 1 Drawing Sheet

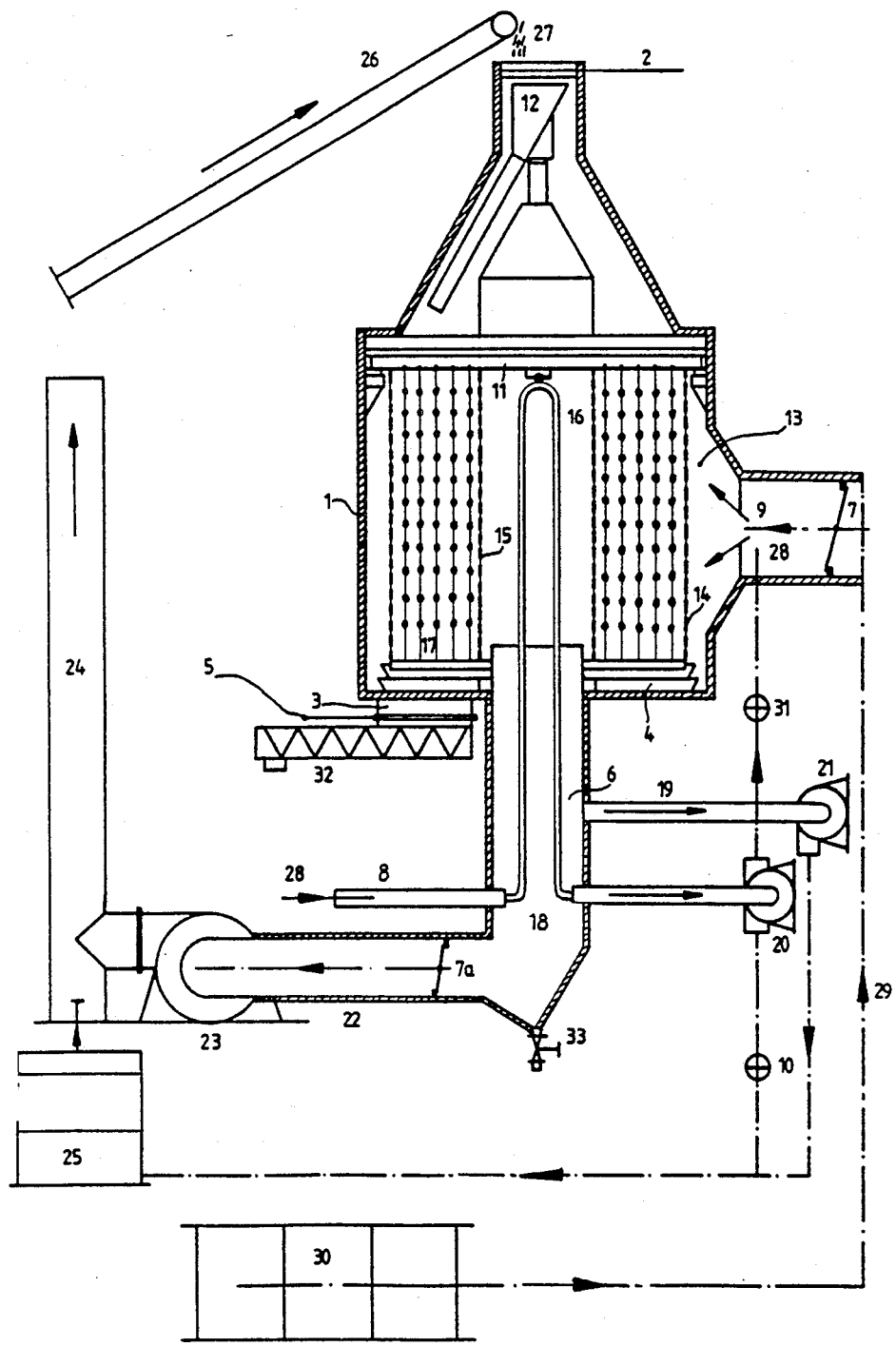

PROCESS AND APPARATUS FOR DRYING AND CONDITIONING CHICKEN MANURE OR SIMILAR PASTY SUBSTANCES

FIELD OF THE INVENTION

The present invention relates to a process and an apparatus for drying and conditioning chicken manure or similar pasty substances by the use of carrier materials employed as heat carriers and as carriers of micro-organisms.

TECHNOLOGY REVIEW

The state of the art of drying pasty substances is as follows:

Pasty substances which can be pumped or sprayed, are dried in spray driers on a cushion of air. In the case of substances that cannot be pumped, costly spraying systems must be used. In addition, contact layer dryers, most of which are indirectly heated, can also be employed. These processes are operated with hot gas or with heat carrier materials and operate at normal atmospheric pressure.

Coarse vacuum dryers are also used for substances that are temperature sensitive.

All of the processes described above are complicated with respect to design and operation; they require large amounts of investment capital and consume large quantities of both heat and energy. Furthermore, as a rule, the dried end products require subsequent processing such as granulation, for example, before they can be placed on the market.

It is the object of the process according to the present invention to dry granulated, pelletized or chipped pasty substances with the least amount of energy, by means of micro-organisms that are concentrated on carrier elements, with a small portion of the available organic or even inorganic substances being converted by the micro-organisms into carbon dioxide, heat and residual substances. Very frequently, these organic substances are not desired in the end product since they produce an unpleasant odor and limit the shelf life of the dried end product. Finally, the dried product should emerge from the drying process in granular form and thus be ready for marketing.

The process according to the invention will be described below using chicken droppings as an example, although the invention is in no way limited to this application. As a consequence of a world-wide tendency to once more use biological fertilizers, attempts are being made to process chicken droppings from large-scale animal holdings so that they can be readily stored and also sold in supermarkets. In this connection, it is important that their water content be reduced to less than 15%, that the product be sterilized so as to destroy all hazardous bacteria, and that the odor be reduced to a point where it has no unpleasant effect on the environment.

Today, the state of the art is such that the droppings are either dried in the sun, if the climate permits, and are then sterilized and rendered odor-free in a drum-type drier heated by means of oil burners. Belt type driers can also be used in place of a drum-type drier. Attempts have also been made to perform these operations by means of indirect driers, such as, for example, tube-type driers, but these resulted in operational malfunctions due to clogging. Furthermore, processes and apparatus have been proposed for the production of fertilizers from organic wastes, particularly from animal manure, in which the manure is subjected to biological decomposition and is then dried.

In all of these known processes, two problems are encountered, namely, on the one hand, a considerable odor pollution of the environment and, on the other hand, the problem of energy costs. The cost for drying with heavy furnace oil account for up to 40% of the total costs of the process.

SUMMARY OF THE INVENTION

These drawbacks of the prior art processes can be overcome by the process according to the invention which provides a process for drying and conditioning chicken manure or similar pasty substances having an organic fraction and being available in stranded, chipped, granulated, pelletized or fiber form which, upon being mixed with organic or inorganic, molded, stable materials results in a loose, air permeable pile of material. The process according to the invention is characterized in that it is carried out in two phases, a microbiological phase followed immediately by flow-through drying phase, both taking place in one and the same apparatus in such a manner that, in the microbiological phase, a climate is created in the closed apparatus and thus in the pile of material by means of a controlled and conditioned flow of air which passes through the pile of material, in which selective micro-organisms that have been settled on molded, stable carrier elements and populate the pile of material find an optimum environment which enables all or some of the organic fractions of the substances to be treated to be processed aerobically, with the resulting carbon dioxide being carried along by the flowing air and the air being heated by the generated heat. Water vapor is carried out of the piece of material and the temperature in the pile of material rises to approximately 80° C. The controlled flow of conditioned air in the pile of material is regulated, for example, by means of temperature sensors and/or humidity indicators, in such a manner that water vapor saturation does not take place nor does the temperature of the pile of material approach the cooling limit temperature. A transition from the microbiological phase to the flow-through drying phase is initiated when the temperature in the pile of material has dropped again, for example to below 60° C., in that then the not-moisture-saturated air flowing through the pile of material is increased to a multiple of the quantity of air used in the microbiological phase, and the flow-through drying process is terminated when the desired degree of desiccation is reached in the pile of material.

As a further feature of the invention it has been found to be expedient for the molded stable carrier elements to be elastically suspended from cables within the apparatus and the respective substance to be processed is introduced through a distributor, is deposited between the cables and is additionally supported by the molded, stable carrier elements. If necessary, uniform distribution of the substance between the cables and the molded, stable carrier elements can be realized by vibrating the tensioned cables and the interior portion of the apparatus.

A further advantageous feature of the process according to the invention provides the controlled, conditioned air for the microbiological phase and the unsaturated air for the flow-through drying phase in the form of exhaust air, for example, from large-scale animal holdings. This air is heated by means of a heat exchanger using the exhaust air from the process, with the heat exchanger simultaneously being disposed in the center of the apparatus to serve as condenser and prevent the creation of a saturated vapor atmosphere in the apparatus, while simultaneously increasing the partial vacuum within the reactor.

According to a further and advantageous embodiment of the process according to the invention, the pH in the pile of material can be changed intentionally to a neutral or even slightly acid range, for example by adding carbon dioxide to the conditioned air flowing through the pile of material, so as to achieve the optimum working environment for the selective micro-organisms. This is being done, for example, by the addition of carbon dioxide to the conditioned air that flows through the mass of material. The addition of flue gas has been found to be particularly suitable for this purpose.

In the process according to the invention, the drying which simultaneously conditions the end product, can be carried out as in the example illustrated in the drawing attached hereto.

Chicken manure 27 previously processed into short strands, for example, by means of a special type of press, is transported by means of a conveyor belt 26 to a reactor 1 and is poured by means of a distributor 12 on top of the already dried chicken manure in the reactor, so as to form a loose and air-permeable pile. The same quantity of chicken manure is simultaneously withdrawn from the base of the reactor as fresh material is introduced at the top. Within reactor 1, there are, for example, vertically suspended carrier materials in the form of cables, with attached, generally organic, carrier elements. A large number of selective micro-organisms have settled on these carrier materials in the course of the reactor start-up procedure.

The term "selective" is here understood to mean that the particular micro-organisms best suited for the respective chicken manure and for the environment provided within the reactor are dominant. The microbiological process is thus optimized, processing time is reduced, and undesirable organic materials are eliminated in an optimum manner. Of course, these carrier materials can also be populated with selective micro-organisms prior to their use.

As soon as the filling process is ended, the first phase of the drying process, the microbiological phase, begins. A defined quantity of air 28 is passed through the loose pile of material. This air supplies the micro-organisms with oxygen and removes heat, carbon dioxide and water vapor. Some of this heat is transferred to the incoming air in a heat exchanger 18. The bacteria now leave the carrier elements, which may have the shape of cubes, and move rapidly into the fresh granulate where they begin to work. This is similar to the action in a compost pile, i.e. the bacteria decompose various organic substances, primarily sugar, fatty acids and other easily decomposable carbon compounds into carbon dioxide an residual substances, thus generating heat. This heat is also generated in the interior of the respective granulate and drives the moisture to the surface, where it is picked up by the passing air and most of it is condensed in heat exchanger 18 and discharged.

In a test plant, it was found, for example, that only very small quantities of impurities or desired substances, such as ammonia, were found in the condensate if the process was controlled in such a manner that a saturated water vapor atmosphere never developed and for that reason, the condensate, which had a pH of 7.8 to 8 could be discharged quite safely into the sewer system.

A second important point for control of the process is seen in the fact that the cooling limit temperature must not be reached, since otherwise the micro-organisms would work far less vigorously or even cease working altogether. In practical operation, the process can be controlled by means of a flap which is installed upstream of the boower and is adjustable by means of temperature and/or humidity sensors within the reactor.

After 20 to 30 hours, depending on the humidity of the fresh material, the moisture in the material has dropped to below 40% and the temperature of the substance begins to drop slightly. This is an indication that the micro-organisms have ceased working because the humidity level is too low. In the test plant, a temperature of 70° to 80° C. was measured in the material at that time. This concludes the microbiological phase of the process. In the test plant, it was noted that all the components that cause an unpleasant odor had been converted and the end product caused no odor pollution.

Then air, for example, from a chicken house, is drawn through the material by means of a blower. After 10 to 15 hours, the material has a final moisture content of less than 15% and can thus be stored indefinitely. The process begins anew. Neither personnel nor process monitoring are required for the duration of the entire process since it can be controlled automatically by means of a simple process control device.

BRIEF DESCRIPTION OF THE DRAWINGS

The process according to the invention will be described in greater detail below with reference to an exemplary embodiment of the apparatus which is illustrated in the drawing figure.

DESCRIPTION OF THE PREFERRED EMBODIMENTS

By means of a conveyor belt 26, previously molded fresh material 27 is delivered to a reactor 1 via distribution chute 12 which rotates slowly about the central axis of reactor 1. At the same time, extractors 4 remove an equal volume of dried material through a discharge chute 3 and a worm conveyor 32. If necessary, the elastically mounted interior of reactor 1 can be caused to vibrate by means of a vibrator 16 so that any adhering dried particles of material are loosened and can also be removed. Once the filling procedure is completed, the microbiological phase of the process begins. Slides 2 and 5 are closed tightly. The formed fresh material lies loosely between perforated sheet-metal cylinders 14 and 15 that are suspended from carriers 11 coaxially with reactor axis 1 and between cables 17 which are suspended from the radially arranged carriers 11 and support wooden cubes (the micro-organism carrers). A specific quantity of air 28 is now drawn in by a blower 20 through a duct 8 and blown into an air duct 9. Prior to this, flaps 7, 7a were tightly closed. Blower 21 now draws air and water vapor from the center of reactor 1 through a conduit 19 and passes this mixture of air and water vapor, for example, through a turf filter 25, in which micro-organisms have also been settled, and hen into a flue 24.

From air duct 9 and through air distribution chamber 13, the air 28 that has been preheated in a heat exchanger 18 is distributed around the reactor and flows through the perforated sheet metal cylinder 14 and through the loosely piled fresh material into the center of the reactor formed by perforated sheet metal cylinder 15. The air supplies the micro-organisms on the micro-organism carriers with oxygen. The fresh material causes the air to become saturated with water vapor and this provides an optimum environment for rapid growth of the micro-organisms. The latter penetrate the fresh material and begin to wok. Carbon dioxide is generated and is removed by the passing air and heat is developed. The heat continuously increases the temperature of the material and the air 28 that passes through it is also heated which increases its ability to absorb water vapor. This water vapor is continuously drawn from the material. The heated, water vapor saturated air collects in the center of the reactor and flows through heat exchanger 18. Here the air is once again cooled since the fresh supply of air 28 flowing through the interior of the heat exchanger is delivered, for example, at 20° C., while [the temperature of] the air coming from the loosely piled material rises slowly from 40° C. up to 80° C. and is saturated with water vapor. Because of the cooling of the air, some of this water vapor condenses on heat exchanger pipes 18, which means that heat transfer is very good and the water, scarcely contaminated, is discharged.

As has been described above, a blower 21 transfers the remaining air and water vapor mixture into the flue. The condensate location in the center of the reactor additionally enhances the flow through the loose material and prevents the formation of a saturated vapor atmosphere within this material. This means that substantially smaller quantities of valuable substances, such as ammonia, for example, are washed out of the material and the waste water is not polluted.

Several temperature probes in the interior of reactor 1 control the quantity of air 28 by means of a flap in feed duct 8.

As soon as the microbiological phase is terminated, blower 20 is switched off, flaps 7, 7a are opened and blower 23 is switched on. Blower 21 continues to operate. Now, air 29 is drawn in, for example, from a chicken house 30. This air arrives with 70% humidity and at 22° to 27° C. It flows through the loosely piled material and picks up water until it is saturated. The saturated exhaust air is conducted through duct 22 into the flue.

The air 28 can also be conducted by means of blower 20 through a peat filter 25 with valve 10 being open and valve 31 closed. This means that the peat filter is washed and the collected water is removed once again. After a certain length of time depending on the type of material being processed, the peat is replaced. The peat removed from the filter contains various valuable substances and is, for example, mixed in with the fresh material.

As soon as the desired final moisture content has been reached, the blowers are shut off and a further quantity of fresh material can be introduced into the system. The drying process can also be carried out without the use of blower 20.

The invention also relates to apparatus for carrying out the process according to the invention, this apparatus being characterized in that, within closed cylindrical vessel 1, a unit is suspended elastically by means of radially arranged carriers 11, with such unit comprising two coaxial cylindrical casings 14 and 15 which permit the passage of air and are suspended from carriers 11 between which, for example, the molded and stable carrier elements are suspended at intervals from cables that are secured to carriers 11. A rotatable feed chute 12 is provided. Air enters through an air duct 9 into an air distribution chamber 13 formed, on the one hand, by the cylindrical vessel 1 and, on the other hand, by elastically suspended cylindrical casing 14 and is extracted from vessel 1 through the elastically suspended cylindrical casing 15 and a bottom discharge pipe 6. A heat exchanger 18 is disposed within cylinder 15 and the dried materials are discharged by means of an extractor 4 into a discharge chute 3. The unit is suspended so as to be vertically vibratable by means of a vibrator 16, thus ensuring removal.

The process according to the invention and the associated apparatus make it possible to dry and condition pasty substances with a minimum of energy with simultaneous formation of a non-perishable and valuable end product directly in granular form and free of unpleasant odors.

I claim:

1. A process for drying and conditioning pasty substances such as chicken manure which are at least partly organic and are in the form of strands, chips, granules, pellets or fibers, comprising the steps of:

adding the pasty substance to a closeable vessel containing carrier elements which comprise selective microorganisms on a solid support, to produce a loose, air permeable pile of pasty substance;

closing said closeable vessel to control air circulation and reduce escape of ammonia;

conditioning said pile within said closed vessel by said selective microorganisms;

controllably forcing a mixture of a first amount of air and carbon dioxide through said pile within said closed vessel to reduce the pH of said pile, to remove excess moisture, carbon dioxide, and heat from said pile and to allow the temperature of said pile to rise to approximately 80° C., thus providing optimal conditions for the selective microorganisms;

forcing a second amount of air greater than said first amount through said pile, when the conditioning step is ended as signaled by the temperature of said pile dropping to below 60° C., to initiate a flow-through drying phase and to produce a dried conditioned product;

ending the forcing of air through said pile when a desired degree of desiccation of said pile is reached; and removing said dried conditioned product from said vessel.

2. The process according to claim 1, characterized in that the molded and stable carrier elements in the apparatus are elastically suspended from cables and the respective substance to be processed is added through a distributor, comes to rest between the cables, and is additionally supported by the molded and stable carrier elements, with vibration being used, if necessary, to realize uniform distribution of the substance between the cables and the molded, stable carrier elements.

3. Apparatus for implementing the process according to claim 2, characterized in that, within a closed cylindrical vessel (1), there is disposed a unit (14, 15, 17) composed of two coaxial air-permeable cylindrical casings (14, 15) which are suspended from supports (11) and between which are located a series of spaced molded stable carrier elements disposed, for example, on cables (17) fastened to the carriers (11); a rotatable feed chute (12) is provided; air enters through an air intake (9) into an air distribution chamber (13) formed, on the one hand, by the cylindrical vessel (1) and, on the other hand, by the elastically suspended cylindrical casing (14) and is extracted from the vessel (1) through the elastically suspended cylinder casing (15) and through an outlet 96) disposed in its bottom; a heat exchanger (18) is provided within cylindrical jacket (15) and the dried substance is discharged by means of a discharge chute (3), with said unit (14, 15, 17) being suspended so as to be vertically vibratable by means of a vibrator (16) to assure removal.

4. The process according to claim 1, characterized in that the controlled, conditioned air for the microbiological phase and also the not-moisture-saturated air for the flow through drying phase is exhaust air, for example, from large scale animal holdings and is heated in a heat exchanger by the exhaust air coming from the process, with the heat exchanger simultaneously being disposed in the center of the apparatus to serve as a condenser so as to prevent the formation of a saturated vapor atmosphere in the apparatus while simultaneously intensifying the partial vacuum within the reactor.

5. Apparatus for implementing the process according to claim 4, characterized in that within a closed cylindrical vessel (1), there is disposed a unit (14, 15, 17) composed of two coaxial air-permeable cylindrical casings (14, 15) which are suspended from supports (11) and between which are located a series of spaced molded stable carrier elements disposed, for example, on cables (17) fastened to the carriers (11); a rotatable feed chute (12) is provided; air enters through an air intake (9) into an air distribution chamber (13) formed, on the one hand, by the cylindrical vessel (1) and, on the other hand, by the elastically suspended cylindrical casing (14) and is extracted from the vessel (1) through the elastically suspended cylinder casing (15) and through an outlet (6) disposed in its bottom; a heat exchanger (18) is provided within cylindrical jacket (15) and the dried substance is discharged by means of a discharge chute (3), with said unit (14, 15, 17) being suspended so as to be vertically vibratable by means of a vibrator (16) to assure removal.

6. The process according to claim 1, wherein the carbon dioxide in the forcing step is in the form of flue gas.

7. Apparatus for implementing the process according to claim 6, characterized in that, within a closed cylindrical vessel (1), there is disposed a unit (14, 15, 17) composed of two coaxial air-permeable cylindrical casings (14, 15) which are suspended from supports (11) and between which are located a series of spaced molded stable carrier elements disposed, for example, on cables (17) fastened to the carries (11); a rotatable feed chute (12) is provided; air enters through an air intake (9) into an air distribution chamber (13) formed, on the one hand, by the cylindrical vessel (1) and, on the other hand, by the elastically suspended cylindrical casing (14) and is extracted from the vessel (1) through the elastically suspended cylinder casing (15) and through an outlet (6) disposed in its bottom; a heat exchanger (18) is provided within cylindrical jacket (15) and the dried substance is discharged by means of a discharge chute (3), with said unit (14, 15, 17) being suspended so as to be vertically vibratable by means of a vibrator (16) to assure removal.

8. Apparatus for implementing the process according to claim 1, characterized in that, within a closed cylindrical vessel (1), there is disposed a unit (14, 15, 17) composed of two coaxial air-permeable cylindrical casings (14, 15) which are suspended from supports (11) and between which are located a series of spaced molded stable carrier elements disposed, for example, on cables (17) fastened to the carriers (11); a rotatable feed chute (12) is provided; air enters through an air intake (9) into an air distribution chamber (13) formed, on the one hand, by the cylindrical vessel (1) and, on the other hand, by the elastically suspended cylindrical casing (14) and is extracted from the vessel (1) through the elastically suspended cylinder casing (15) and through an outlet (6) disposed in its bottom; a heat exchanger (18) is provided within cylindrical jacket (15) and the dried substance is discharged by means of a discharge chute (3), with said unit (14, 15, 17) being suspended so as to be vertically vibratable by means of a vibrator (16) to assure removal.

* * * * *